United States Patent [19]

Kaneda et al.

[11] Patent Number: 4,771,914
[45] Date of Patent: Sep. 20, 1988

[54] AIR BAG TRIGGERING DEVICE

[76] Inventors: Koichi Kaneda, 13, Juichiban-cho 4-chome, Nakagawa-ku, Nagoya-shi, Aichi-ken; Toshihiko Fukuda, 80, Naruko-cho 3-chome, Midori-ku, Nagoya-shi, Aichi-ken, both of Japan

[21] Appl. No.: 109,240

[22] Filed: Oct. 15, 1987

[30] Foreign Application Priority Data

Oct. 22, 1986 [JP] Japan ................... 61-251285

[51] Int. Cl.$^4$ ............................................ B60R 21/08
[52] U.S. Cl. ............................................ 222/3; 222/500; 222/505; 280/734; 280/737; 137/45
[58] Field of Search ................ 222/3, 5, 500, 505, 222/509, 507; 280/734, 742, 736, 737; 180/282

[56] References Cited

U.S. PATENT DOCUMENTS

| | | | |
|---|---|---|---|
| 3,767,227 | 10/1973 | Furasho et al. | 280/734 |
| 4,204,703 | 5/1980 | Okada | 280/734 |
| 4,704,032 | 11/1987 | Fiala | 280/734 |

FOREIGN PATENT DOCUMENTS 967192  5/1975  Canada .................... 280/737

*Primary Examiner*—Charles A. Marmor
*Attorney, Agent, or Firm*—Paul L. Sjoquist

[57] ABSTRACT

An air bag triggering device comprises a cylindrical frame, a slide member slidably mounted within the cylindrical frame and operable to open a pipeline connecting a high-pressure gas cylinder to an air bag, and a link mechanism operatively associated with the slide member. The link mechanism includes a latch lever adapted to releasably engage the slide member, a swing lever engageable with the latch lever, a support member interposed between the latch lever and the swing lever and having opposite ends pivotally supported on the latch lever and swing lever, and a pendulum pivotally mounted and movable by impacts applied thereto. The support member is normally located within a critical line connecting the fulcrum thereof on the latch lever to the axis of pivotal movement of the swing lever, so that a pivotal force is imparted to the swing lever to thereby engage the one end of the swing lever with the outer end of the latch lever and maintain the one end of the latch lever and the latching portion of the slide member in their engaged position. With this arrangement, when the swing lever is pivoted through swinging movement of the pendulum to urge the support member beyond the critical line, the swing lever is turned to disengage the one end of the latch lever from the latching portion of the slide member.

3 Claims, 4 Drawing Sheets

AIR BAG TRIGGERING DEVICE

BACKGROUND OF THE INVENTION

The present invention relates to a device for triggering an air bag system adapted to protect a passenger upon collision of a vehicle such as an automobile, and more particularly to such an air bag triggering device including a link mechanism operatively connecting a sensor with a slide member so that the device is inactive when an impact or vibration smaller than a predetermined limit is applied, and is operable from a reference position at all times.

In order to protect a passenger in an automobile upon collision thereof, the present inventors have already developed such an air bag triggering device employing a high-pressure gas as a pressure source. This air bag triggering device is disclosed in Japanese Laid-Open Utility Model Publication No. 61-153652.

As shown in FIG. 4, this conventional air bag triggering device includes an inertia weight member 21 serving as a sensor, a slide member 22, an operating lever 23, a push rod 24, a ball valve 25, etc. When an impact is applied to the air bag triggering device as a consequence of collision, the inertia weight member 21 is moved in a direction of the arrow A, and a hook portion 21a formed at one end of the inertia weight member 21 is released from a latching portion 22a of the slide member 22 biased by a spring 26. As a result, the slide member 22 is moved by a restoring force of the spring 26 in a direction of the arrow B. Then, the slide member 22 strikes the operating lever 23 to pivot the latter about a pivotal shaft 27. As a result, the operating lever 23 strikes the push rod 24. The push rod 24 is formed at its front end with a wedge-shaped portion 24a which is adapted to push a ball 28 of the ball valve 25. Then, the ball 28 is disengaged from a valve seat 29 of the ball valve 25, thus introducing the high-pressure gas in a high-pressure cylinder 30 into an air bag (not shown) along the arrows C.

However, the aforementioned device has the following problems. Generally, various impacts may be applied to an automobile or the like in addition to impacts caused by collisions. Sometimes, the engaged position between the latching portion 22a of the slide member 22 and the hook portion 21a of the inertia weight member 21 can be shifted from a set position depending on the conditions of vibration and friction. Accordingly, there is a possibility that the air bag triggering device cannot start its operation from a reference position. Furthermore, it is difficult to adjust the sensitivity of the inertia weight member 21 serving as the sensor, causing the difficulty in ensuring the triggering accuracy of the device.

SUMMARY OF THE INVENTION

It is an object of the present invention to provide an air bag triggering device which is inoperative when a relatively small impact and vibration is applied thereto.

It is another object of the present invention to provide an air bag triggering device which may always start its operation from an original reference position.

It is a further object of the present invention to provide an air bag triggering device which may adjust its operating range to a predetermined value and which may improve the triggering accuracy.

According to the present invention, there is provided an air bag triggering device positioned in a pipeline connecting a high-pressure gas cylinder to an air bag. The device includes a valve housing having one end connected to the high-pressure gas cylinder and a tubular base member having one end coaxially secured to the other end of the valve housing. The base member has an outlet port for connection to the air bag and a conical valve seat formed on the one end. A ball is disposed in the valve housing and is adapted to engage the valve seat of the base member and close the opening defined thereby. A push rod is axially movably supported within the base member and is adapted to push the ball and open the pipeline. A cylindrical frame is provided and is connected at one end to the other end of the base member. A slide member is slidably mounted within the cylindrical frame. The slide member has one end engageable with the push rod and the other end formed with a latching portion. A compression coil spring is positioned around the slide member and is adapted to bias the slide member toward the push rod. A latch lever is pivotally supported by the cylindrical frame and has one end engageable with the latching portion of the slide member. A swing lever is pivotally supported by the cylindrical frame and has one end engageable with the other end of the latch lever. A support member is provided having one end pivotally supported on the other end of the latch lever and the other end pivotally supported by the swing lever slightly above the fulcrum of pivotal movement of the swing lever. The support member is normally located inside a critical line connecting the fulcrum thereof on the latch lever to the axis of pivotal movement of the swing lever, so that a pivotal force is imparted to the swing lever to thereby engage the one end of the swing lever with the other end of the latch lever and maintain the one end of the latch lever and the latching portion of the slide member in their engaged position. A pendulum is pivotally mounted and movable by impacts applied thereto. The pendulum has a projection formed thereon and adapted to engage the swing lever and move the swing lever in a direction in which the swing lever is disengaged from the latch lever. With this arrangement, when the swing lever is pivoted through swinging movement of the pendulum to urge the support member beyond the critical line, the swing lever is turned from the other end of the latch lever to thereby disengage the one end of the latch lever from the latching portion of the slide member.

The invention will be more fully understood from the following detailed description and appended claims when taken with the drawings.

DETAILED DESCRIPTION OF THE PREFERRED EMBODIMENT

Figure 1:
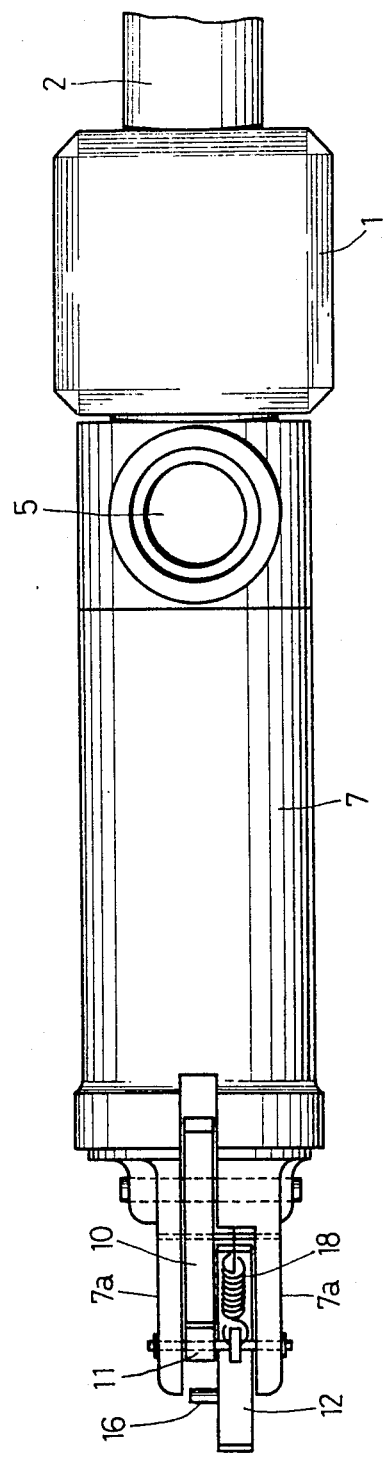
FIG. 1 is a plan view of an air bag triggering device according to a preferred embodiment of the present invention.
Figure 2:
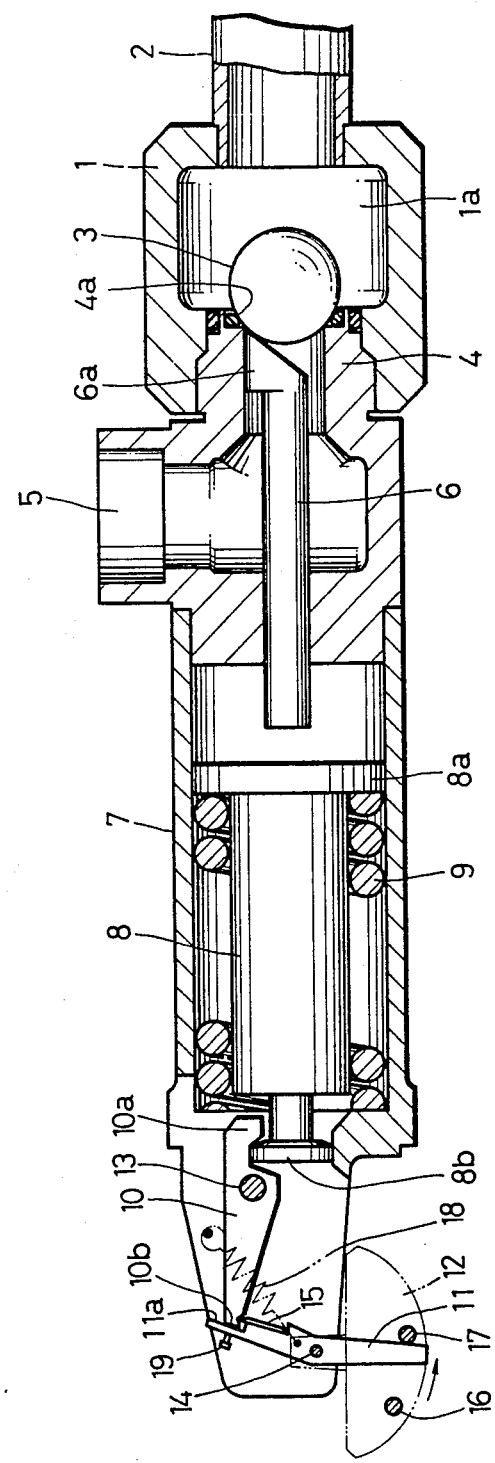
FIG. 2 is a vertical sectional view of the air bag triggering device shown in FIG. 1.

Referring to FIGS. 1 and 2, reference numeral 1 denotes a valve housing in which a valve chamber 1a is defined. The valve chamber 1a communicates at its one end through a pipe 2 with a high-pressure gas cylinder (not shown), and is connected at the other end to a tubular base member 4 having at one end thereof a conical valve seat 4a which is normally in contact with a ball 3. The base member 4 is formed at its upper end with an outlet port 5 communicating with an air bag (not shown). The ball 3 is enclosed in the valve chamber 1a, and is normally urged against the valve seat 4a by the pressure of the high-pressure gas, thereby closing a passage formed in the base member 4. The base member 4 includes a push rod 6 having at one end thereof a wedge-shaped portion 6a which is normally in contact with the ball 3. The other end of the push rod 6 projects from the front end of the base member 4.

A cylindrical frame 7 is fixed at the front end of the base member 4. A slide member 8 is slidably mounted within the frame 7 and is positioned forwardly of the base member 4 so as to push the push rod 6. The slide member 8 is formed at its rear end with a flange 8a, and is formed at its front end with a latching portion 8b. The flange 8a of the slide member 8 is disposed in spaced-apart opposing relation to the push rod 6. A compression coil spring 9 is interposed between the flange 8a and the front inner end surface of the frame 7. The compression spring 9 is normally retained in its greatly compressed position. When an impact is applied to the device, the compression spring 9 is released from the greatly compressed position, causing the slide member 8 to strike the push rod 6 and thence the ball 3 to be disengaged from the valve seat 4a. The frame 7 is formed at its front end with a forked portion 7a in which a link mechanism including a latch lever 10, a swing lever 11 and a pendulum 12 is provided.

Figure 3:
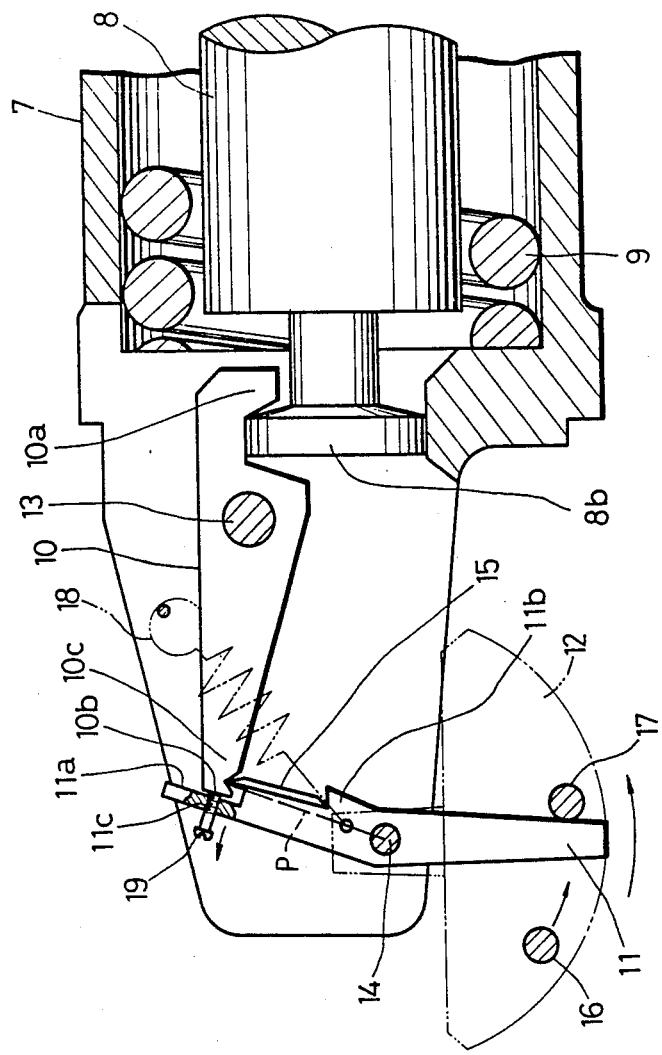
FIG. 3 is an enlarged vertical sectional view of the essential parts of the present invention.
Figure 4:
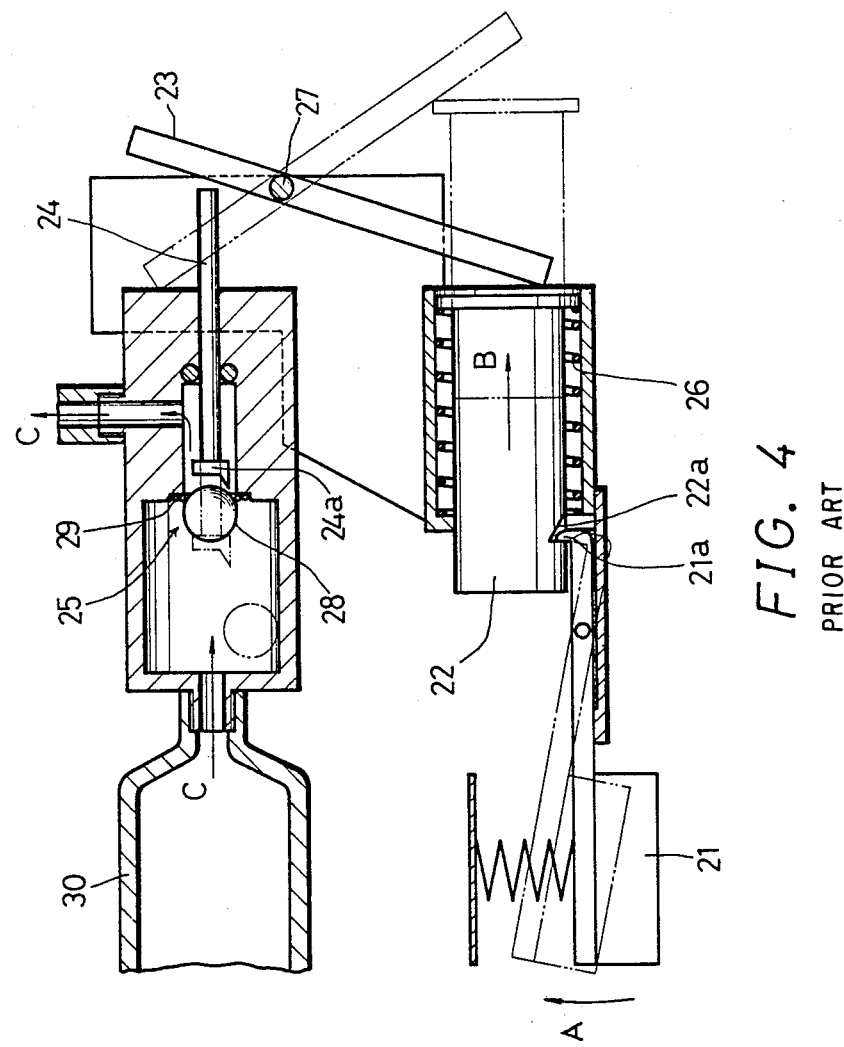
FIG. 4 is a horizontal sectional view of the essential parts of the conventional air bag triggering device.

As is best seen in FIG. 3, the latch lever 10 is rotatably supported by a pivotal shaft 13 adjacent the rear end of the forked portion 7a of the frame 7, and is formed at one end with a hook portion 10a releasably engageable with the latching portion 8b of the sliding member 8. The latch lever 10 is designed to pivot in a direction such that the hook portion 10a disengages from the latching portion 8b. In the embodiment illustrated, the hook portion 10a is retained on the latching portion 8b, and by virtue of the sliding member 8 being biased rightwardly (as viewed in FIG. 3) by the spring 9, a pivotal force in the counterclockwise direction is applied to the latch lever 10. Alternatively, a resilient member such as a spring to apply pivotal force may be suitably provided between the frame 7 and the hook portion 10a of the latch lever 10.

The swing lever 11 is rotatably supported by a pivotal shaft 14 at a substantially central portion thereof, and is adapted to abut at its one end 11a against a front end surface 10b of the latch lever 10.

A bar-like support member 15 is interposed between a front end portion 10c of the latch lever 10 and a medial portion 11b of the swing lever 11 for receiving the pivotal force of the latch lever 10. Specifically, the support member 15 has opposite ends formed in a knife edge-shaped configuration, and the front end portion 10c of the latch lever 10 and the medial portion 11b of the swing lever 11 are formed with V-shaped grooves in which the opposite ends of the support member 15 are pivotally supported. Thus, the support member 15 is normally positioned inwardly (rightwardly as viewed in FIG. 3) from a straight line P connecting the pivotal point of the support member 15 on the latch lever 10 to the axis of the pivotal shaft 14 about which the swing lever 11 pivots. The straight line P will be hereinafter referred to as a critical line. The support member 15 serves to apply a pivotal force to the swing lever 11 in a clockwise direction so that the upper end 11a of the swing lever 11 abuts against the front end surface 10b of the latch lever 10. Upon abutting engagement with the front end surface 10b of the latch lever 10, the pivotal movement of the swing lever 11 is stopped to maintain the engagement between the hook portion 10a of the latch lever 10 and the latching portion 8b of the slide member 8.

The pendulum 12 serving as a sensor for driving the swing lever 11 is pivotally supported by the pivotal shaft 14 of the swing lever 11 in juxtaposed relationship with the swing lever 11. The pendulum 12 has a projection 16 engageable with the swing lever 11 and adapted to turn the latter in a counterclockwise direction such that the upper end 11a of the swing lever 11 is moved away from the front end surface 10b of the latch lever 10. Further, although the pendulum 12 is supported by the pivotal shaft 14 of the swing lever 11, it may of course be supported by an independent shaft.

While the present invention is constructed basically in the above-mentioned manner, the following additional components may be provided. The pendulum 12 may be provided with a projection 17 for turning the swing lever 11 clockwise in a direction such that the upper end 11a of the swing lever 11 abuts against the front end surface 10b of the latch lever 10. The pendulum 12 may be further provided with a return spring 18 for applying the pivotal force in the clockwise direction. Preferably, the return spring 18 is provided between the frame 7 and the pendulum 12 generally above the pivotal shaft 14. Of course, any other means for applying the pivotal force may be provided.

Further, an adjuster 19 for the link mechanism may be provided at the upper end 11a of the swing lever 11 in such a manner as to contact the front end surface 10b of the latch lever 10. Preferably, a tap hole 11c is formed through the upper end 11a of the swing lever 11 in opposing relation to the front end surface 10b of the latch lever 10, and an adjusting screw as the adjuster 19 is threadedly engaged in the tap hole 11c. Thus, the abutting position of the swing lever 11 against the front end surface 10b of the latch lever 10 may be changed by adjusting the adjuster 19 and therefore, the support member 15 may be moved toward and away from the critical line P, thereby adjusting the operating range of the link mechanism.

In operation, when various impacts are applied to the vehicle during running, the pendulum 12 of the air bag triggering device swings about the pivotal shaft 14 depending on the degree of impact. In the case that the degree of the impact is small, the weight of the pendulum 12, the position of the projection 16 and the spring force of the return spring 18 are set so that the projection 16 will not abut against the swing lever 11. Upon application of the impact, the pendulum 12 is swung by the gravity clockwise and counterclockwise. However, in the case that the return spring 18 is mounted on the pendulum 12, a clockwise moment due to the resilient force of the return spring 18 is applied to the pendulum 12, and accordingly the projection 17 acts to positively return the swing lever 11 which has been swung counterclockwise to the original position shown in FIG. 3.

When an impact greater than a predetermined limit is applied to the vehicle, the projection 16 of the pendulum 12 abuts against the swing lever 11 and turns the swing lever 11 counterclockwise about the pivotal shaft 14. Thus, when the counterclockwise pivotal force overcomes the clockwise pivotal force, the swing lever 11 initiates to pivot counterclockwise, and the support member 15 is therefore displaced counterclockwise. If the clockwise pivotal force exceeds the counterclockwise pivotal force until the support member 15 is displaced to reach the critical line P, the swing lever 11 is returned to the original position.

When the support member 15 is displaced outside beyond the critical line P, the thrust of the support member 15 tends to urge the swing lever 11 counterclockwise. As a result, the engagement among the latch lever 10, the support member 15 and the swing lever 11 are broken, and the latch lever 10 is turned counterclockwise to thereby disengage the hook portion 10a of the latch lever 10 from the latching portion 8b of the slide member 8. Then, the slide member 8 is rightwardly moved by the resilient force of the spring 9 to strike the push rod 6. Accordingly, the wedge-shaped portion 6a of the push rod 6 is forced into the sealed position between the ball 3 and the valve seat 4a of the base member 4. Thus, the ball 3 is moved away from the valve seat 4a to permit the high-pressure gas filled in the gas cylinder to be introduced into the air bag, thereby expanding the latter.

Having thus described the preferred embodiment of the invention, it should be understood that numerous structural modifications and adaptations may be made without departing from the spirit of the invention.

What is claimed is:

1. An air bag triggering device positioned in a pipeline connecting a high-pressure gas cylinder to an air bag comprising:
   a valve housing having one end connected to said high-pressure gas cylinder;
   a tubular base member having one end coaxially secured to the other end of said valve housing, said base member having an outlet port for connection to said air bag and a conical valve seat formed on the one end;
   a ball disposed in said valve housing and adapted to engage said valve seat of said base member and close the opening defined thereby;
   a push rod axially movably supported within said base member and adapted to push said ball and open said pipeline;
   a cylindrical frame connected at one end to the other end of said base member;
   a slide member slidably mounted within said cylindrical frame, said slide member having one end engageable with said push rod and the other end formed with a latching portion;
   a compression coil spring positioned around said slide member and adapted to bias said slide member toward said push rod;
   a latch lever pivotally supported by said cylindrical frame and having one end engageable with said latching portion of said slide member;
   a swing lever pivotally supported by said cylindrical frame and having one end engageable with the other end of said latch lever;
   a support member having one end pivotally supported on the other end of said latch lever and the other end pivotally supported by said swing lever slightly above the fulcrum of pivotal movement of said swing lever, said support member being normally located inside a critical line connecting the fulcrum thereof on said latch lever to the axis of pivotal movement of said swing lever, so that a pivotal force is imparted to said swing lever to thereby engage the one end of said swing lever with the other end of said latch lever and maintain the one end of said latch lever and the latching portion of said slide member in their engaged position; and
   a pendulum pivotally supported by said cylindrical frame and movable by impacts applied thereto, said pendulum having a projection formed thereon and adapted to engage said swing lever and move said swing lever in a direction in which said swing lever is disengaged from said latch lever,
   whereby when said swing lever is pivoted through swinging movement of said pendulum to urge said support member beyond the critical line, said swing lever is turned from the other end of said latch lever to thereby disengage the one end of said latch lever from the latching portion of said slide member.

2. The air bag triggering device as defined in claim 1 wherein said pendulum includes a second projection formed thereon for moving said swing lever in a direction in which said one end of said swing lever abuts against the other end of said latch lever, and a return spring for imparting a pivotal movement thereto in said direction.

3. The air bag triggering device as defined in claim 1 wherein said swing lever includes an adjusting screw threadably secured to said one end thereof and adapted to bear against the other end of said latch lever and adjust the distance defined therebetween.

* * * * *